Dec. 3, 1935.  O. B. CLARK  2,022,706
LUBRICATING DEVICE
Original Filed Oct. 15, 1932
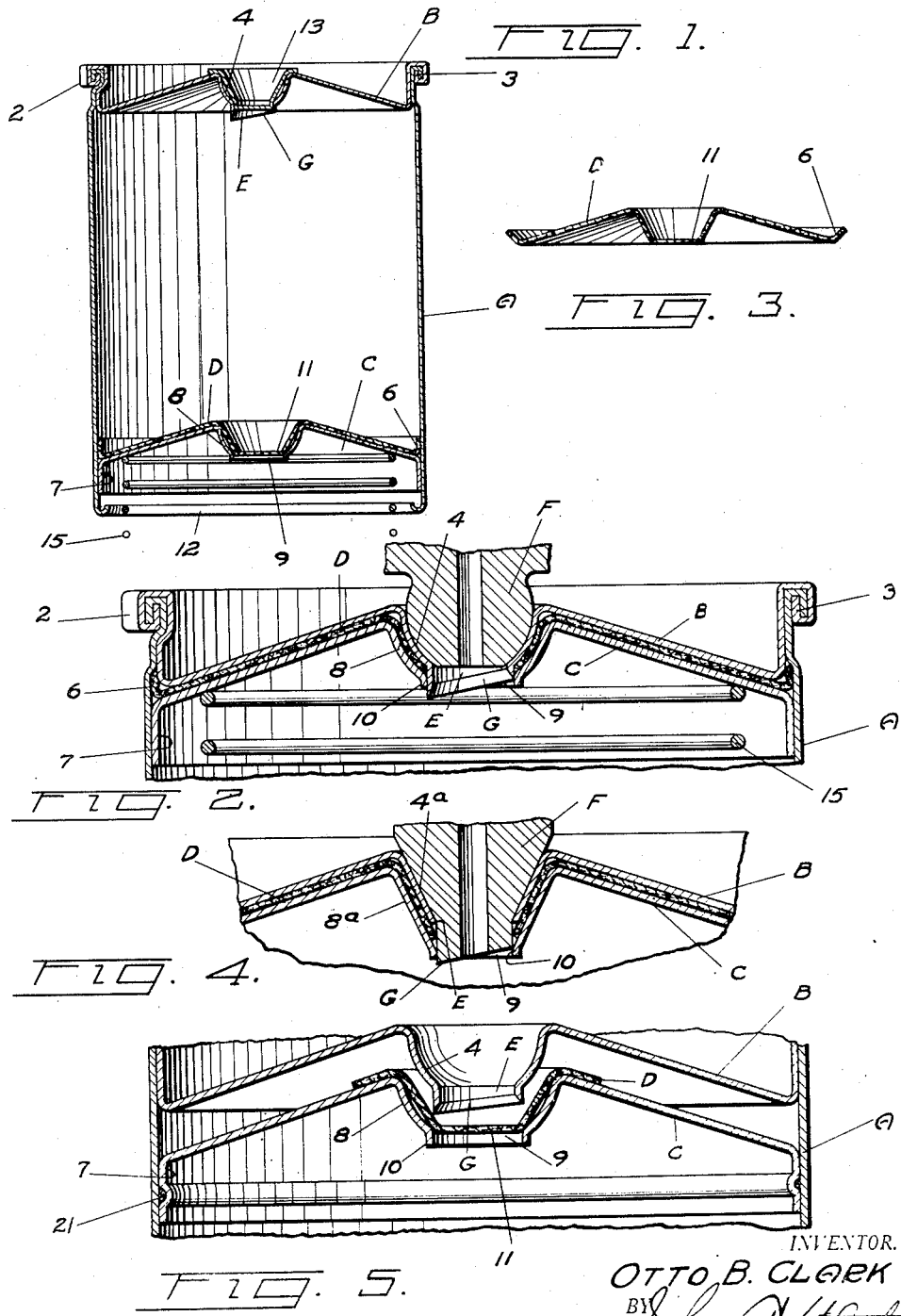
INVENTOR.
OTTO B. CLARK
BY
ATTORNEY.

Patented Dec. 3, 1935

2,022,706

UNITED STATES PATENT OFFICE 2,022,706

LUBRICATING DEVICE

Otto B. Clark, South Bend, Ind., assignor to The Lubrication Corporation, South Bend, Ind., a corporation of Delaware Application October 15, 1932, Serial No. 637,917
Renewed December 11, 1933

16 Claims. (Cl. 206—56)

This invention relates to lubrication devices and more particularly to lubricant cartridges for use in lubricant guns, compressors and various types of lubricant dispensing apparatus.

Heretofore lubricant has been presented to the consumer for use in lubricant dispensing apparatus in replaceable cartridges thereby providing the advantages of cleanliness and convenience in handling. This method was also intended to assure the consumer of a certain warranty regarding the quality of the lubricant by identifying the cartridge with the manufacturer's name as well as the grade of lubricant contained therein. A disadvantage of this arrangement however is the ease with which unscrupulous parties may refill the exhausted cartridge with a cheap and inferior lubricant and resell the same trading upon the good-will and reputation of the original producer of the cartridge.

An object of the invention is to provide a simple and effective non-refillable lubricant cartridge.

Another object is to provide a lubricant cartridge wherein the follower or piston of the cartridge is rendered inoperative upon its arrival to a position within the cartridge representing the complete exhaust of lubricant from within the cartridge.

A further object is to provide a lubricant cartridge wherein the force employed to urge the cartridge piston against the lubricant cartridge contents is utilized to perforate the head of the piston.

Other objects, the advantages and uses of the invention will be, or should become apparent after reading the following description and claims and after consideration of the accompanying drawing forming a part of this specification, in which:

Fig. 1 is a sectional view of a lubricant cartridge constructed in accordance with the invention;

Fig. 2 is an enlarged fragmentary sectional view of the cartridge of Fig. 1 illustrating the piston as it appears when the lubricant in the cartridge is exhausted;

Fig. 3 is a sectional view of the frangible piston sealing member;

Fig. 4 is a view similar to Fig. 2 of another form of the cartridge; and

Fig. 5 is a view similar to Fig. 2 of still another form of the cartridge.

In general, the lubricant cartridges selected for illustration herein comprise, a cylindrical body A one end of which is closed by a head B and the other end by a piston assembly including a rigid piston member C slidably mounted within the cylinder and a frangible piston sealing member D, a lubricant outlet opening E through the head B the walls of which are formed to provide sealing contact with a cartridge connector stud F associated with the gun or lubricant dispenser with which the cartridge is used, and a shearing edge G which may be formed upon the walls of the outlet opening E of the cartridge or upon the stud F as desired for perforating or rupturing the frangible piston sealing member D when the piston assembly arrives at the inner end of the cartridge.

With reference to the cartridge illustrated in Figs. 1 to 3, inclusive, bayonet lugs 2 are formed in the seam 3 which secures the head B to the cylinder A. The bayonet lugs 2 are intended for engagement with cooperating bayonet members on the gun or dispenser with which the cartridge may be used to draw the cartridge into close engagement with the connector stud F and thus create a lubricant tight seal between the contacting surfaces of the walls 4 of the cartridge outlet opening E and the outer wall of the stud F. In the present form of the cartridge the walls 4 have been shown as spherical to conform to the spherical head of the stud F thus providing universal engagement between the members so as not to destroy sealing contact through angular misalignment. It is preferable, when the cartridge is used with a spherical stud F, to form the cutting or shearing edge G upon the inner edge of the walls of the outlet opening E and to slightly incline the plane of the edge with respect to the axis of the cylinder A.

The sealing member D is preferably formed of heavy paper or light cardboard stock which may be treated to render it impervious to oil. In contour, the member D follows substantially that of the inner head wall of the piston C and in addition has a forwardly extending flared portion 6 at its periphery which is adapted to engage with the inner wall of the cylinder A as shown in Fig. 1. The metal piston C is formed with a skirt 7 also engaging the side walls of the cylinder A to act as a guide surface for the piston and to prevent its becoming cocked with respect to its normal axis of travel within the cartridge. The central portion 8 of the piston head may be inwardly depressed to follow the contour of the head B of the cartridge so that the piston may move close to the inner wall of the head B to thus assure complete withdrawal of lubricant from the cartridge. An opening 9 defined by cylindrical side walls 10 is provided centrally of the depressed portion 8 of the piston and is of such diameter as to telescopically receive the annular cutting edge G of the cartridge head B. This opening 9 through the piston C is normally closed by the central and imperforate portion 11 of the sealing member D. A bead 12 is formed at the rearward end of the cylinder A to prevent the extraction of the piston assembly from the cartridge and a removable metal cap 13 completes the structural elements of the cartridge. It is intended that the cartridge be filled by the manufacturer subsequent to assembly by injecting lubricant through the outlet opening E with the piston near the inner end of the cylinder but not sufficiently close to damage the sealing member D. In this manner the lubricant as it enters the cartridge will cause the piston to move toward the rearward end of the cylinder A until it is stopped by engagement with the bead 12. Thereupon the cap 13 may be pressed in place and the cartridge labelled or otherwise prepared for sale.

In use the cartridge, subsequent to the removal of the cap 13, may be attached to the lubricant gun or dispenser with the connector stud F contacting the wall portion 4 of the cartridge head B, by any desirable method such as a bayonet connection between gun and cartridge utilizing the bayonet lugs 2 of the cartridge as an element of the attaching means. It is desirable that the manner of attaching the parts one to another shall result in pressure between the connector stud and contacting surfaces of the cartridge head to assure a lubricant tight seal.

As lubricant is drawn into the gun or dispenser during operation the piston C with its sealing member D will follow the lubricant by virtue of atmospheric pressure, or, if desired a compression spring 15 may be employed to bear upon the piston to place the lubricant under low positive pressure and thus assist the lubricant in its passage from the cartridge into the gun or dispenser. As the cartridge becomes empty the piston C and sealing member D will move into engagement with the adjacent wall of the head B of the cartridge and the cutting edge G will shear away and sever the central portion 11 of the sealing member D thus rendering the piston ineffective as such for future use. At the same time the flared portion 6 of the sealing member may become crumpled and otherwise mutilated by contact with the joined side and head walls of the cartridge so that its usefulness as a seal between piston and cylinder walls is destroyed.

A cartridge constructed as described herein may not again be filled as the piston member C is permanently installed within the cylinder A by virtue of the beaded portion 12 thereof and therefore no practical method of removing the mutilated sealing member D and substituting another is made possible. As an additional guard the manufacturer, if he so desires, may imprint his name or signature on the exposed area of the central portion 11 of the sealing member thus causing the identified portion of the sealing member to be sheared away as the cartridge is emptied.

In Fig. 4 another embodiment of the invention is illustrated which differs from that shown in Figs. 1 to 3, inclusive, in that the cutting or shearing edge G is formed on the cartridge connector stud F and in the formation of the contacting surface of the walls 4a of the cartridge outlet E and the cooperating contact surface of the stud F substantially conical instead of spherical to provide a wedging action as the cartridge is urged toward the connector stud. The sealing member D is fashioned to conform to the contour of the piston head which like the head B of the cartridge is formed with a substantially conical wall portion 8a about the opening 9 to conform to the contour of the inner surface of the cartridge head.

In operation this form of the cartridge serves to render the sealing member D inoperative by shearing away the central portion 11 of the member and in crumpling its outer flared portion 6. However instead of forming the shearing edge G on the cartridge it is formed as a part of the stud F. An advantage of this structure over that previously described is a considerable saving in the cost of the construction of the cartridge head B.

In Fig. 5 another form of the cartridge piston assembly is shown wherein a packing ring 21 of cotton string or other suitable packing material is provided for the piston skirt 7 and located in an annular groove formed therein. The sealing member D comprises a simple heavy paper or cardboard member adapted to fit into the depressed central head portion of the piston about the opening 9 and to thereby close the opening.

In operation, engagement of the piston assembly with the cutting edge G of the head B upon the emptying of the cartridge may result in shearing away the central portion 11 of the sealing member and therefore render the piston inoperative for further use.

It is to be understood that the described embodiments of the invention herein set forth are presented for the purpose of illustration only, and various changes may be made therein without departing from the spirit and scope of the invention.

I claim:

1. A cartridge for fluids and for semi-fluids such as grease comprising, a cylindrical member having a closure forming a head at one end, a piston including a sealing member slidably mounted in said cylindrical member and adapted to bear upon the material contained in said cylindrical member and to move toward said head, and means operable upon the movement of the piston into engagement with the adjacent portions of said head for rendering the sealing member of said piston inoperative for further use within the cartridge.

2. A cartridge for fluids and for semi-fluids such as grease comprising a cylindrical member having a closure forming a head at one end, a piston having a sealing member, said piston being slidably mounted in said cylindrical member and adapted to bear upon the material therein, and means operable upon the movement of the piston toward adjacent portions of said head for mutilating said sealing member.

3. A cartridge for fluids and for semi-fluids such as grease comprising, a cylindrical member having a closure forming a head at one end, a piston having a sealing member, said piston being slidably mounted in said cylindrical member and adapted to bear upon the material therein, and means operable upon the movement of the piston toward adjacent portions of said head for perforating said sealing member.

4. A cartridge for fluids and for semi-fluids such as grease comprising, a hollow body having an outlet opening in one end, a piston having an opening therethrough, said piston being slidably mounted within the body and adapted to bear upon the material contents thereof, a frangible sealing member for closing the opening through the piston, and means operative upon the movement of the piston toward that end of the body having said outlet opening for perforating said frangible piston seal.

5. A cartridge for fluids and for semi-fluids such as grease comprising, a hollow body having an outlet opening, the walls of the body about said opening being formed to provide a shearing edge directly inwardly of the body, and a piston assembly slidably mounted within the hollow body and adapted to bear upon the contents thereof, said piston assembly including a frangible seal in registration with said shearing edge whereby movement of said piston assembly into engagement with said shearing edge may destroy said seal.

6. A cartridge for fluids and for semi-fluids such as grease comprising, a hollow container for confining the contents thereof, one wall of said container being in the form of a piston, said container having openings through opposed walls thereof including said piston, a frangible sealing member for closing one of said openings, and means operable upon movement of said piston wall toward the opposed wall of the container for rupturing said frangible seal.

7. A cartridge for fluids and for semi-fluids such as grease comprising, a hollow container for confining the contents thereof, one wall of said container being in the form of a piston, said container having openings through opposed walls thereof including said piston, a frangible sealing member for closing one of said openings, said sealing member being disposed within the walls of said container, and means operable upon movement of said piston wall toward the opposed wall of the container for rupturing said frangible seal.

8. A cartridge for fluids and for semi-fluids such as grease comprising, a cylindrical member having a closure at one end, a piston having a sealing member, said sealing member being disposed on the inner wall of the piston, said piston being slidably mounted in said cylindrical member and adapted to bear upon the material therein, and means operable upon the movement of the piston toward the adjacent portions of said head for mutilating said sealing member.

9. A cartridge for fluids and for semi-fluids such as grease comprising, a hollow body having an outlet opening in one end, a piston having an opening therethrough, said piston being slidably mounted within the body and adapted to bear upon the contents thereof, a frangible sealing member for closing the opening through the piston, said sealing member being greater in diameter than said opening and arranged to overlie the adjacent inner walls of the piston, and means operable upon the movement of the piston toward that end of the body having said outlet opening for perforating said frangible piston seal.

10. In combination, a lubricant cartridge for use in a lubricant dispensing device, a dispensing device having a cartridge connector stud for introduction into an opening in the cartridge for the purpose of withdrawing lubricant therethrough, a piston in said cartridge, and a sealing member for said cartridge adapted to be moved with said piston into engagement with said stud whereby to rupture the sealing member.

11. A non-refillable lubricant cartridge of the type wherein the piston seal is caused to be ruptured when the cartridge has been exhausted comprising, a hollow body having an opening in one end, a piston slidably mounted in said body, said piston having a preformed opening therethrough in registration with said opening in said body and a frangible sealing member disposed over said piston opening on the inner side of said piston.

12. In combination, a lubricant cartridge comprising, a hollow body having an opening in one end, a piston slidably mounted in said body, said piston having an opening therethrough in registration with said opening in said body, a frangible sealing member for closing said piston opening disposed on the inner wall of said piston, and means providing a shearing edge adapted to enter said body through said body opening and to cooperate with the opening through said piston to punch out that portion of said sealing member covering said piston opening.

13. A lubricant cartridge comprising, a hollow body having an outlet opening in one end, a piston slidably mounted in said body, a sealing member disposed on the inner face of said piston and having a flared portion adapted to engage with the side walls of the body to form a seal between the piston and adjacent body walls, and means operable upon the movement of said piston to the limit of its travel into said body for mutilating the sealing member to render the seal between the piston and body wall ineffective.

14. A lubricant cartridge comprising, a hollow body having an outlet opening in one end, a piston having an opening therethrough and slidably mounted in said body, a sealing member disposed on the inner face of said piston adapted to cover said opening and having a flared portion adapted to engage with the side walls of the body to form a seal between the piston and adjacent body walls, and means operable upon the movement of said piston to the limit of its travel into said body for mutilating the sealing member to render the seal between the piston and body wall ineffective and to perforate that portion of said seal covering said piston opening.

15. A lubricant cartridge comprising a cylindrical member having a closure at one end, a piston having a frangible paper board sealing member and slidably mounted in said cylindrical member adapted to bear upon the lubricant therein, and means operable upon the movement of the piston into engagement with the adjacent portions of said head for rupturing said frangible paper board sealing member.

16. A lubricant cartridge comprising, a hollow body, a piston slidably mounted in said body and formed with an opening therethrough, a frangible cap for closing said piston opening, and means operable upon movement of the piston inwardly of the body toward the limit of its travel to rupture said cap.

OTTO B. CLARK.